US006172706B1

United States Patent
Tatsumi

(10) Patent No.: US 6,172,706 B1
(45) Date of Patent: *Jan. 9, 2001

(54) VIDEO CAMERA WITH AUTOMATIC ZOOM ADJUSTMENT BASED ON DISTANCE BETWEEN USER'S EYES

(75) Inventor: Shingo Tatsumi, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/630,950

(22) Filed: Apr. 5, 1996

(30) Foreign Application Priority Data

Apr. 19, 1995 (JP) .................................................... 7-093750
Apr. 19, 1995 (JP) .................................................... 7-093751

(51) Int. Cl.[7] .......................... H04N 5/225; G03B 13/00; G03B 17/00; G06K 9/00
(52) U.S. Cl. .......................... 348/169; 348/347; 348/358; 382/118
(58) Field of Search .............................. 382/118; 348/135, 348/347, 358, 361, 77, 399, 169, 170; 396/14, 18

(56) References Cited

U.S. PATENT DOCUMENTS

| 5,083,201 | * | 1/1992 | Ohba | 348/399 |
| 5,426,483 | * | 6/1995 | Suzuki . | |
| 5,430,809 | * | 7/1995 | Tomitaka | 382/173 |
| 5,434,621 | * | 7/1995 | Yu | 348/347 |
| 5,696,995 | * | 12/1997 | Hauang et al. | 396/2 |
| 5,719,951 | * | 2/1998 | Shackelton et al. | 382/118 |
| 5,835,641 | * | 11/1998 | Sotoda et al. | 348/358 |
| 5,870,138 | * | 2/1999 | Smith et al. | 348/169 |

* cited by examiner

Primary Examiner—Wendy Garber
Assistant Examiner—Alicia M. Harrington
(74) Attorney, Agent, or Firm—Morgan & Finnegan, L.L.P.

(57) ABSTRACT

An video camera capable of auto-zoom control, where light projector 14 irradiates a subject at fixed periods, a correlation calculator 16 inputs an image signal pre-stored in a memory 6 and an image signal from an image sensor 2 into an adder 7, and outputs information on bright points, corresponding to the subject's eyes upon light emission period of the light projector 14, into a zoom controller 18. The zoom controller 18 controls a zoom driver 12 such that an interval between the subject's eyes, detected based on the input bright point information, is a predetermined value.

25 Claims, 6 Drawing Sheets

VIDEO CAMERA WITH AUTOMATIC ZOOM ADJUSTMENT BASED ON DISTANCE BETWEEN USER'S EYES

BACKGROUND OF THE INVENTION

This invention relates to a video camera which stores moving images into a storage medium, image processing apparatus and image control apparatus.

Recently, along with the development of image processing technologies and the diffusion of video cameras, automation of various adjustment mechanisms for the video cameras has progressed. Actually, video cameras having automated mechanisms such as white-balance adjustment, exposure adjustment and auto-focus function are manufactured. However, in zoom adjustment, i.e., control of the subject image size within an image-sensing screen, an operator's intention should be the first priority, therefore, a video camera capable of automatic zoom adjustment has not appeared on the market.

Considering a case where a video camera is most likely used for taking portraits, e.g., a presentation or a teleconference, as one of the purposes of video cameras, the image-sensing screen usually displays the upper part of a body (bust shot). In such case, it is preferable that a subject image displayed on the image-sensing screen always has approximately the same size. For this reason, a video camera that automatically performs zoom adjustment upon image sensing the upper part of a body is desired.

Also, a video camera that has a pan head with automatic homing function so as to locate the upper parts of the bodies to approximately the same position, e.g., the center of the image-sensing screen is desired. However, to provide these video cameras, problems such as complexity in recognition of a subject person, low recognition efficiency and costs must be solved.

SUMMARY OF THE INVENTION

The present invention has been made in consideration of the above situation, and has its object to provide a video camera, image processing apparatus and image control apparatus which can easily obtain a portrait of a subject.

According to the present invention, the foregoing object is attained by providing a video camera having:
a zoom lens capable of varying its focal distance; image sensing means for image-sensing a subject via the zoom lens and outputting a video signal of the subject; and signal processing means for converting the video signal into a display signal, comprising:
light projection means for projecting light on the subject at fixed time intervals;
memory means for storing the video signal outputted by the image sensing means;
calculation means for calculating a feature of the subject based on the video signal stored in the memory means and the video signal outputted by the image sensing means; and
zoom driving means for driving the zoom lens such that the feature of the subject is a pre-stored first predetermined value.

In accordance with the present invention as described above, the focal distance of the zoom lens is controlled such that a feature of the subject is the first predetermined value, and the image-sensing screen always displays a subject image in approximately the same size.

Further, the foregoing object is attained by providing a video camera having:
image sensing means for image-sensing a subject and outputting a video signal of the subject; and
signal processing means for converting the video signal into a display signal, comprising:
light projection means for projecting light on the subject at fixed intervals;
memory means for storing the video signal outputted by the image sensing means;
calculation means for calculating a value of a feature of the subject based on the video signal stored in the memory means and the video signal outputted by the image sensing means; and
pan head control means for controlling an external pan head or pan head of the video camera for changing a direction of the video camera such that the feature of the subject is a pre-stored second predetermined value.

In accordance with the present invention as described above, the pan head is controlled such that the feature of the subject is the second predetermined value, and the image-sensing screen always displays a subject image approximately at the same position.

Further, the foregoing object is attained by providing a video camera having:
a zoom lens capable of varying its focal distance;
image sensing means for image-sensing a subject via the zoom lens and outputting a video signal of the subject; and
signal processing means for converting the video signal into a display signal, comprising:
light projection means for projecting light on the subject at fixed intervals;
memory means for storing the video signal outputted by the image sensing means;
calculation means for calculating a value of a feature of the subject based on the video signal stored in the memory means and the video signal outputted by the image sensing means;
zoom driving means for driving the zoom lens such that the feature of the subject is a pre-stored third predetermined value; and
pan head control means for controlling an external pan head or pan head of the video camera for changing a direction of the video camera such that the feature of the subject is a pre-stored fourth predetermined value.

In accordance with the present invention as described above, the focal distance of the zoom lens is controlled such that the feature of the subject is the third predetermined value, and the pan head is controlled such that the feature of the subject is the fourth predetermined value, then the image-sensing screen always displays a subject image in approximately the same size, and always displays a subject image approximately at the same position.

Preferably, in the video camera, the subject is a human being, and wherein the feature of the subject is an interval between the subject's eyes.

Preferably, in the video camera, the calculation means extracts light reflected from retinas of the subject's eyes when the light projection means projects light on the subject, and calculates the interval between the subject's eyes based on the extracted light.

Preferably, in the video camera, the calculation means calculates the interval between the subject's eyes based on a reference clock from the image sensing means and horizontal and vertical scanning signals of the video camera.

Preferably, in the video camera, the light projection means projects light having a wavelength within a spectral sensitivity range of the image sensing means.

Preferably, in the video camera, the light projection means projects light having a wavelength within a range of red light signal of the image sensing means.

Preferably, in the video camera, wherein the light is infrared light.

Preferably, in the image processing apparatus, wherein the calculation means calculates an interval between eyes of the subject image.

Further, the foregoing object is attained by providing an image processing apparatus comprising:

detection means for processing an image signal, indicative of an image of a subject, inputted from outside of the apparatus, and detecting an image of an eye of the subject;

calculation means for calculating a change amount of a position and that of a size of the subject in the image of the subject, based on output from the detection means; and control means for controlling the position and the size of the subject in the image of the subject in accordance with the change amounts calculated by the calculation means.

Preferably, in the image processing apparatus, the calculation means calculates an interval between eyes of the subject image.

Preferably, in the image processing apparatus, the detection means has irradiation means for emitting infrared light, and the detection means detects infrared light reflected from retinas of the subject in the subject image.

Preferably, in the image processing apparatus, the calculation means calculates an interval between eyes of the subject and a change amount of position of the eyes.

Preferably, the image processing apparatus further comprises a camera for image-sensing the subject, and the control means controls a direction of the camera to correct the change amounts.

Preferably, the image processing apparatus further comprises a camera for image-sensing the subject and a zoom lens capable of varying its focal distance, and the control means controls the zoom lens to correct the amounts of change.

Further, the foregoing object is attained by providing an image control apparatus for controlling a camera and for inputting image sensed by the camera, comprising:

detection means for processing an image of subject sensed by the camera and detecting an image of an eye of the subject;

calculation means for calculating a change amount of a position and that of a size of the subject in the image of the subject based on output from the detection means; and control means for controlling the position and/or size of the subject image in accordance with the change amounts calculated by the calculation means.

Thus, the present invention can attain image sensing where the size of a subject image in an image-sensing screen is always approximately the same by detecting a feature of the subject and controlling the camera based on the detected feature.

Preferably, in the image control apparatus, the detection means detects an interval between eyes of the subject.

Preferably, in the image control apparatus, the detection means has irradiation means for emitting infrared light, and the detection means detects infrared light reflected from retinas of the subject.

Thus, the position and the size of the subject image can be detected based on the feature of the subject obtained by utilizing so-called "red eye" phenomenon.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of a video camera of the present invention will be described in detail in accordance with the accompanying drawings. First, the construction of an image sensing circuit will be described.

Figure 1:
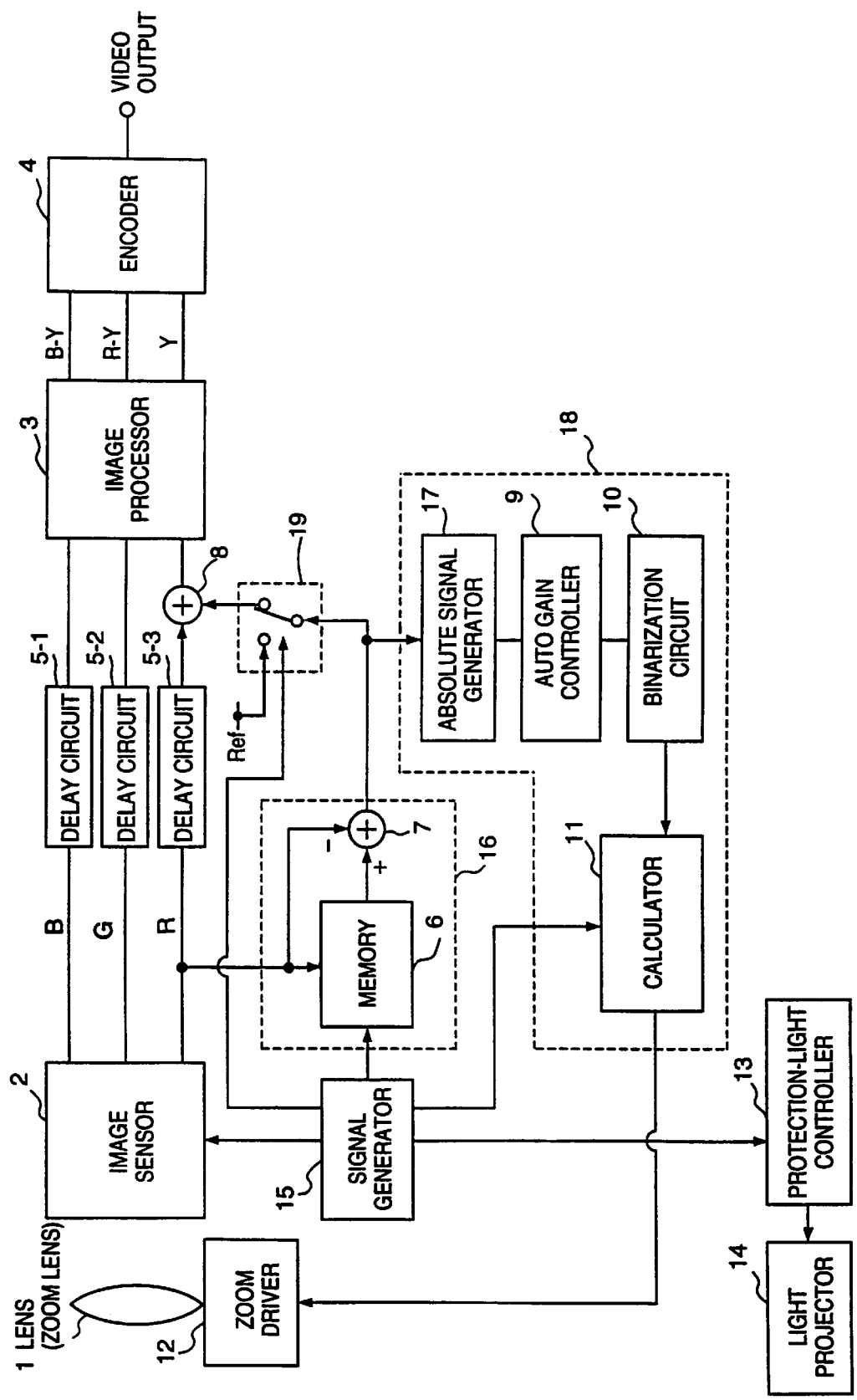
FIG. 1 is a block diagram showing the construction of an image sensing circuit in a video camera, according to an embodiment of the present invention.

FIG. 1 is a block diagram showing the construction of the image sensing circuit in a video camera, according to an embodiment of the present invention.

In FIG. 1, light reflected from a subject (not shown) is passed through a zoom lens 1, and an image is formed on an image-sensing screen of an image sensor 2. The image sensor 2 performs photoelectric conversion on the light from the zoom lens 1 into an electric signal, and through predetermined processing, outputs three primary color R, G and B video signals. The B and G signals are forwarded to an image processor 3 via delay circuits 5-1 and 5-2. The R signal is forwarded to the image processor 3 via a delay circuit 5-3 and an adder 8.

The image processor 3 performs necessary processing such as white-balance adjustment and g correction on the input signals, and outputs the processed signals as respective luminance signal Y and color-difference signals R-Y and B-Y to an encoder 4. The encoder 4 converts the signals from the image processor 3 into an output video signal then outputs the signal.

On the other hand, the R signal outputted from the image sensor 2 is inputted as a negative input into a memory 6 of a correlation calculator 16 and an adder 7. The output from the memory 6 is inputted into the adder 7 as a positive input. The output from the adder 7 is inputted into one of input terminals of the adder 8 provided between the delay circuit 5-3 and the image processor 3, and at the same time inputted into an auto gain controller 9 of a zoom controller 18.

The output from the auto gain controller 9 is inputted into a binarization circuit 10, in which it is converted into a binary signal having "1" and "0" values, and outputted to a calculator 11.

The calculator 11 performs calculation based on the binary output signal from the binarization circuit 10 and drives a zoom driver 12 based on the calculated result. Numeral 17 denotes an absolute signal generator which adjusts the polarity of the signal from the adder 7 to be constant in all the frames.

Numeral 14 denotes a light projector which projects light under the control of a projection controller 13.

Numeral 15 denotes a signal generator which generates various timing signals including a timing signal for the overall operation of the video camera, drive timing signals for image sensing devices (not shown) and video-signal generation timing signal. The signal generator 15 supplies the respective devices with necessary timing signals.

Note that FIG. 1 shows only signal paths from the signal generator 15 necessary for explaining the present embodiment. Actually there are a plurality of signal paths for supplying the respective devices with the necessary timing signals.

Preferably, the wavelength of the light projected from the light projector 14 is a red color light (e.g., red component within the spectral sensitivity range (spectral red frequency component) of the R-signal in FIG. 1) otherwise infrared light, invisible to human eyes but sensible to the image sensor 2. More preferably, the infrared light, with invisibility to human eyes, has little influence on the scene of image sensing, further, it does not cause blinking and constriction of the pupils of the subject.

Next, the operation of the present embodiment will be described.

The projection controller 13 controls the light projector 14 to repeat light emission and light-out alternatively based on a frame period upon image sensing by the image-sensing apparatus in FIG. 1. This control timings is as shown in FIGS. 2(1) to 2(9) which is a timing chart showing respective operations of the image-sensing apparatus.

Figure 2:
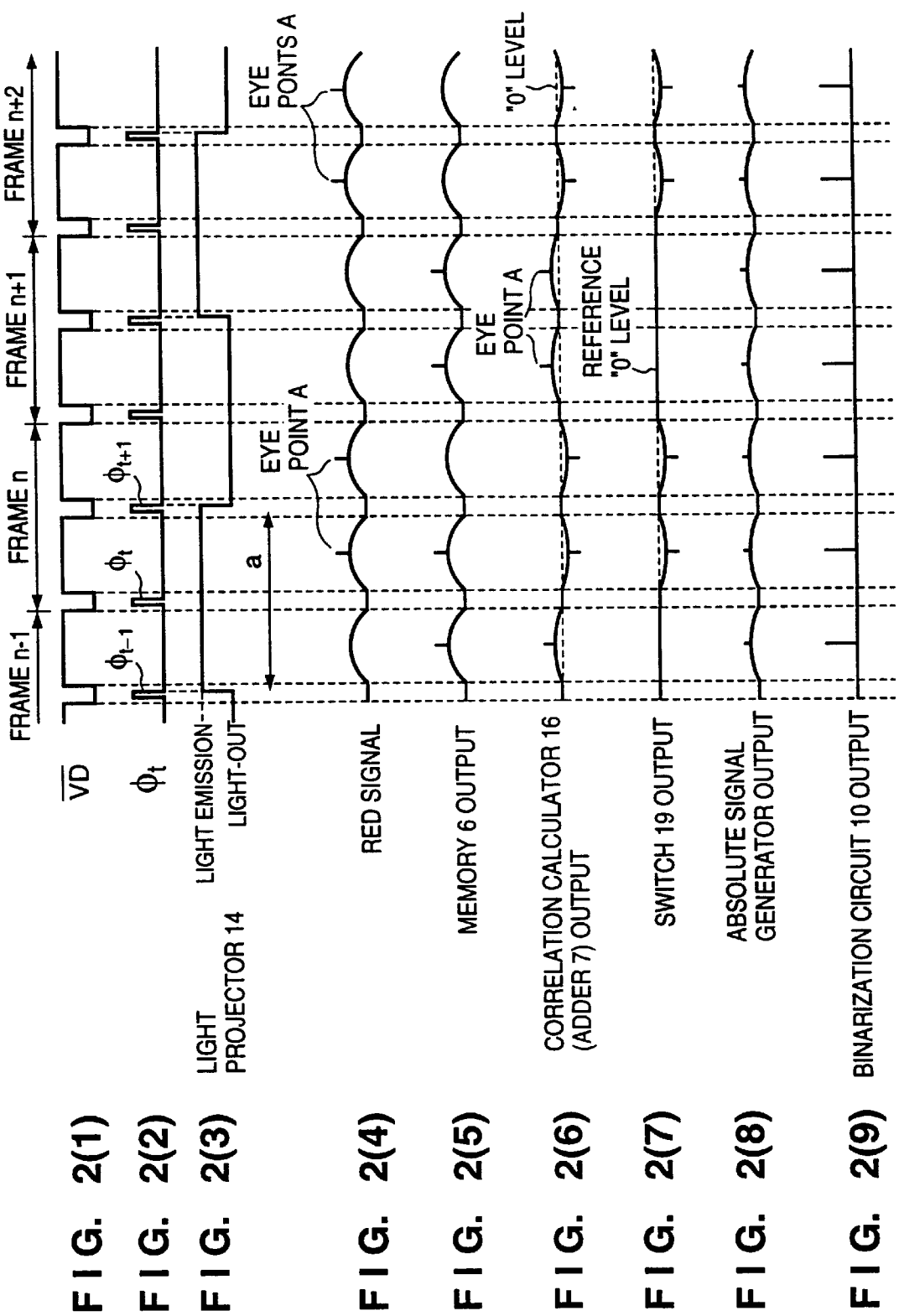
FIGS. 2(1) to 2(9) are a timing chart explaining the operation of the image sensing circuit of the embodiment.

FIG. 2(3) denotes the light emission and light-out timings each corresponding to one frame period (n). Note that the light emission and light-out are switched by using a so-called transfer gate pulse $\phi_t$ represented by timing FIG. 2(2).

The transfer gate pulse $\phi_t$ is known as a pulse for reading electric charge accumulated in photoelectric transducer elements (e.g., photodiodes) in image-sensing devices of the image sensor 2 and transferring to a CCD transfer line (not shown). Accordingly, a signal accumulated between two positive pulses $\phi_t$ (i.e., $\phi_{t-1}$ and $\phi_t$) is read by the next pulse $\phi_{t+1}$. For example, an image-sensing signal resulting from the light projector 14 emitting light during period "a" is read as a video signal during the frame period n.

As the light projector 14 emits light to a subject at this light-emission timing, the quantity of light during the emission period is greater than that during the light-out period.

It is well known that when a subject is image-sensed, intense light projected on the face causes "red eye" phenomenon due to the reflection by the retinas, since the retinas selectively reflect the long wavelength component.

By emitting light (especially infrared light) at output timing FIG. 2(4), a light signal R impinging upon the eyes can be selected.

The present embodiment will be described on the assumption that the video camera is placed directly facing the subject i.e., at the height of the eyes. The signal R output, the couple of points A (FIGS. 2(1) to 2(9)) at the tops of two curvature during one frame period in interlaced scanning correspond to detection of reflected light from the subject's eye, are extracted as a bright point. Though the subject actually has two eyes, the signal R timing FIG. 2(4) gives the couple of points A corresponding to only one eye, since this output timing shows vertical synchronous scanning (subscanning direction on the image screen) by the image sensing circuit. Therefore, in FIGS. 2(1) to 2(9), the couple of eye points A is referred to as a singular reference, an eye point A, corresponding to a bright point indicative of the position of eyes.

The signal R is stored into the memory 6 (frame memory in this embodiment), delayed for one frame, and subtraction between the delayed signal and the signal one-frame subsequent is made by the adder 7, thus the correlation between the frames is obtained. FIG. 2(6) denotes the frame correlation output (output from the adder 7).

FIG. 2(5) denotes the timing of memory 6 output where the signal output is delayed for one frame in comparison with the R signal, the eye point A extracted in frame period at the R signal timing FIG. 2(4) is extracted in the positive curvatures in the next frame period n+1, in the frame correlation output FIG. 2(6). Note that the line of the correlation output raises to some extent without the eye point A since other portions of the face reflect some quantity of light.

The output signal from the correlation calculator 16 is inputted into the switch 19, which outputs "correlation output" and "reference zero (0) level" as shown at switch 19 output timing FIG. 2(7). This output signal is added to the R signal by the adder 8, which cancels influences in the video signal by light emitted from the light projector 14.

The delay circuit 5-3 is used for adjusting the R signal from the image sensor 2 inputted into the other input terminal of the adder 8 to the time delay of the R signal inputted via the memory 6 and the switch 19. The delay circuits 5-1 and 5-2 are used for adjusting the outputs from the image sensor 2 to the time delay of the R signals at the adder 8. Accordingly, if no time delay occurs, the delay circuits 5-1 to 5-3 are unnecessary.

The above-described timing control obtains excellent images without influence of light emitted from the light projector 14 (e.g. red-eye phenomenon) in the video signal.

Next, the zoom control of the present apparatus will be described.

The output from the correlation calculator 16 (adder 7) is forwarded to the zoom controller 18. In the zoom controller 18, the absolute signal generator 17 unifies the polarity of the output signal from the correlation calculator 16 to be constant in all the frames (output FIG. 2(8)), the auto gain controller 9 controls the signal levels to a constant peak level through the frames (i.e., to obtain a constant peak level of the eye points), and the binarization circuit 10 converts the signal into a binary signal having "1" and "0" values (output FIG. 2 (9)). Thus the positions of the subject's eyes are extracted.

Then, the calculator 11 calculates the interval between the eyes by using the extracted eye position information, and controls the zoom driver 12 such that the interval is a predetermined value. The predetermined value is determined based on a pre-selected image-sensing size such as a portrait (bust shot), as the size of the face i.e. the interval between the eyes. Accordingly, the zoom control in corresponding with the predetermined interval between the eyes can automatically determine the image-sensing size.

In a case where the correlation calculator 16 cannot detect the interval between the subject's eyes, or the interval is longer than the predetermined value, it is judged that proper detection data has not been obtained. In this case, the zoom controller 18 does not change but maintains the current zoom status. This prevents erroneous zooming when the subject moves or turns away from the camera, thus improves the reliability of image sensing.

If the correlation calculator 16 cannot detect the interval between the subject's eyes within a predetermined period, the zoom-control status is set to an initial set value.

Further, the size of an image in the image-sensing screen can be varied by an operator by programming the calculator 11.

Note that the calculator 11 comprises simple hardware such as a microprocessor.

The calculator 11 processes an output signal from the binarization circuit 10, a vertical synchronous scanning pulse VD and a horizontal synchronous scanning pulse HD, and calculates information on two-dimensional positions of the subject's eyes.

Figure 4:
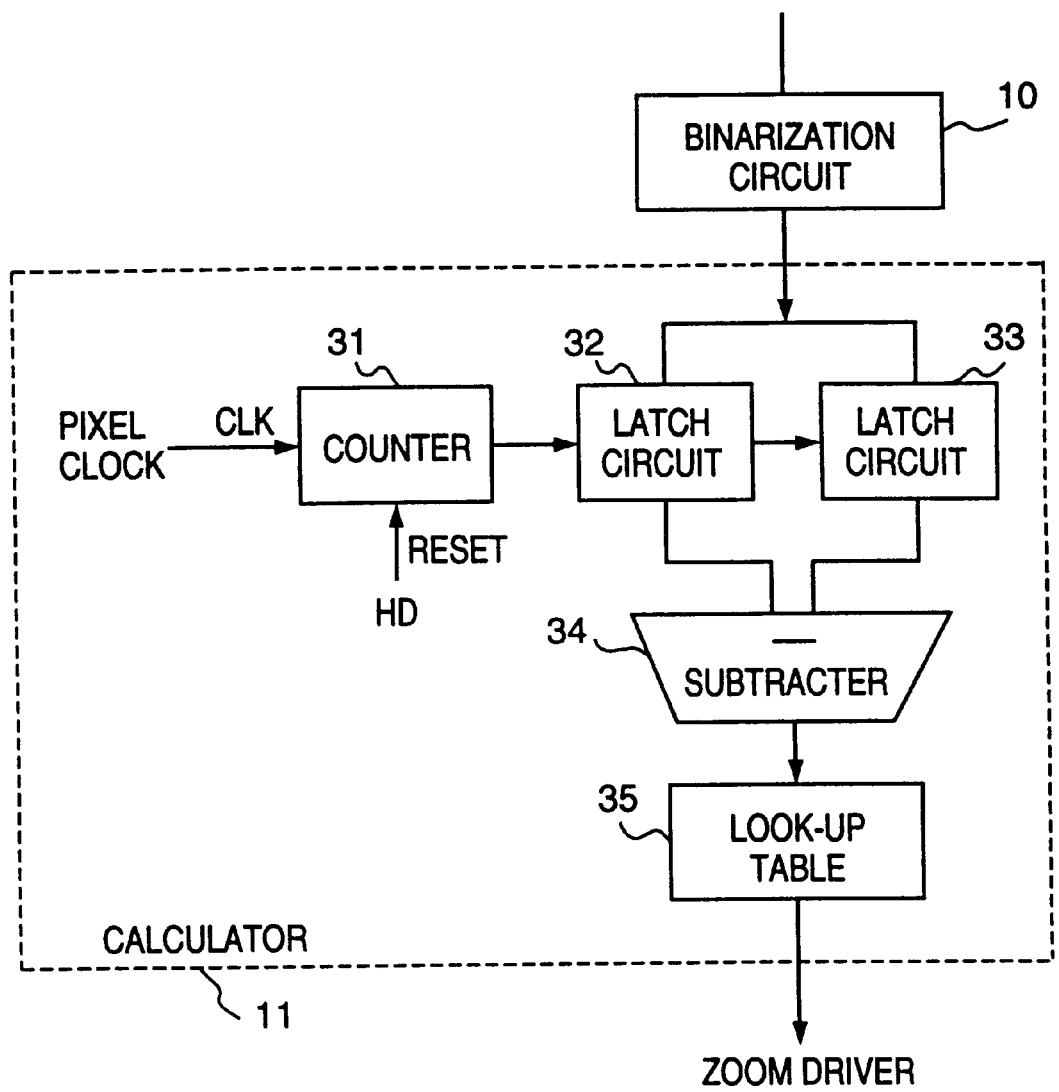
FIG. 4 is a block diagram showing the construction of a calculator of the embodiment.

FIG. 4 is a block diagram showing the construction of the calculator 11 of the embodiment.

In FIG. 4, numeral 31 denotes a counter in which the transfer gate pulse $\phi_t$ transferred from the image sensor 2, i.e., a pixel clock is always inputted as a reference clock; 32, a latch circuit for maintaining the count value of the counter 31; 33, a latch circuit for maintaining the latched count value of the latch circuit 32; 34, a subtracter which calculates the absolute value of the difference between the values of the latch circuits 32 and 33; and 35, a look-up table (LUT).

In the calculator 11 having the above construction, elements, except the LUT 35, are reset each time the vertical synchronous scanning pulse VD is inputted. The counter 31 is reset each time the horizontal synchronous scanning pulse HD is inputted.

The count value of the counter 31 is inputted into the latch circuit 32. When the value of the output from the binarization circuit 10 is "1", i.e., when a bright point corresponding to the subject's eye is detected, the count value from the counter 32 is maintained. This obtains the position of the eyes in a horizontal direction in the vertical synchronous scanning, i.e., information on the two-dimensional position of the bright points.

Thereafter, when the value of the output from the binarization circuit 10 is "1" again, as the bright point corresponds to the subject's opposite eye, the latch circuit 32 forwards the count value at that time to the latch circuit 33, and newly maintains the count value of the counter 31. Thus, the information on the two-dimensional positions of the subject's both eyes is obtained by the latch circuits 32 and 33.

Then, the subtracter 34 calculates the absolute value of the difference between the count values of the latch circuits 32 and 33, as the interval between the subject's eyes. In this case, the count values maintained at the respective latch circuits are both components in the horizontal direction. Accordingly, simple calculation of the absolute value of the difference between these values can be applied to even a case where the line connecting the subject's eyes is slanted to some degree, i.e., when one of the bright points is detected at different vertical synchronous scanning period.

The LUT 35 contains in advance intervals between eyes and corresponding zoom driving amounts for image-sensing a subject with a predetermined size (predetermined interval between the eyes) within the image-sensing screen.

Note that the calculator 11 is reset at each time the horizontal synchronous scanning pulse VD enters, however, once the subtracter 34 obtains the interval between the subject's eyes, the same output signal from the LUT 35 is continuously (including the light-out period of the light projector 14) inputted into the zoom driver 12 until a new value is obtained from the subtracter 34.

As described above, the interval between the subject's eyes can be calculated (various calculation method for obtaining the interval are known) from the information on the two-dimensional positions of the "red eyes" and the zooming is controlled based on the obtained interval between the eyes.

Note that the absolute signal generator 17, the auto gain controller 9 and the binarization circuit 10 are provided for obtaining the information on the positions of the "red eyes" (positional information within the two-dimensional image-sensing screen), and the calculator 11 is not limited to this construction.

Figure 3:
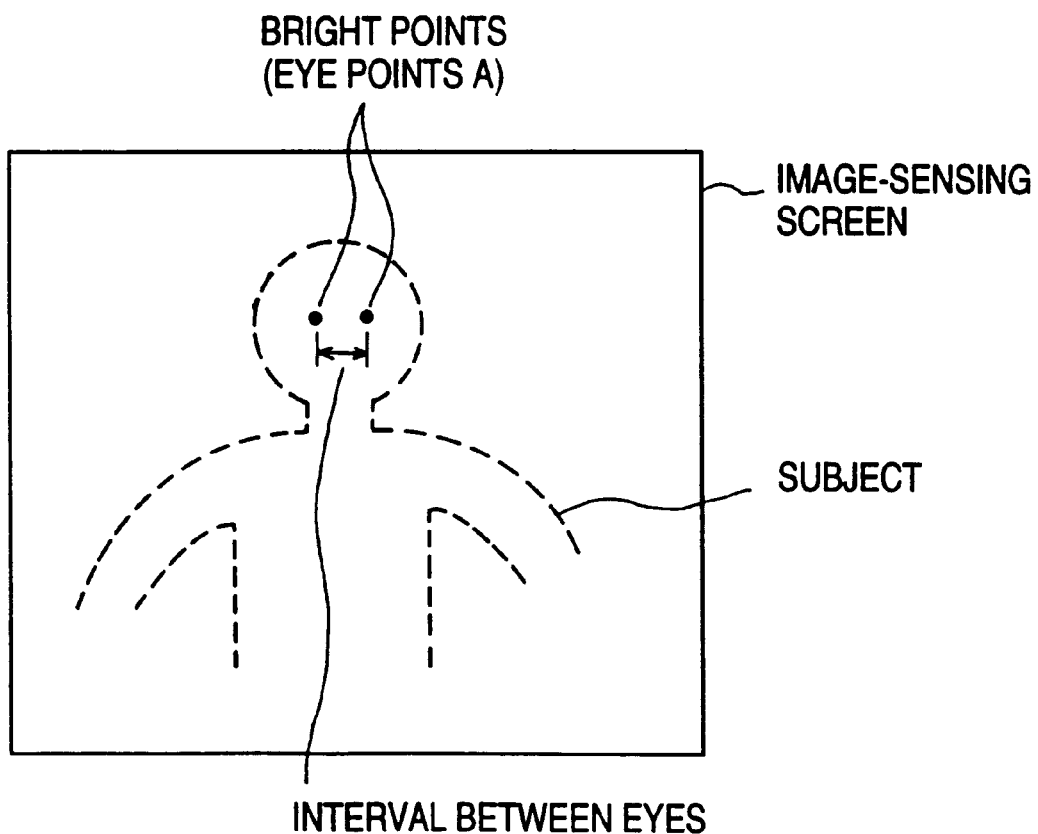
FIG. 3 is an explanatory view showing the positional relation between an image-sensing screen and a subject person's eyes in the embodiment.

FIG. 3 illustrates an image on the image-sensing screen representing the bright points (eye points A) extracted by the zoom controller 18 as the positions of the subject's eyes. The zoom controller 18 does not input the image signal of the subject but it inputs only the information on the subject's eyes.

In this embodiment, the "red eye" information is extracted by utilizing the frame correlation. However, the present invention is not limited to this extraction. For example, the information may be extracted by utilizing field correlation. Otherwise, the information on the subject's eyes may be detected for each field or frame, based on the outline of the subject's face, the reflected image from the retinas and the like, so as to detect the movement of the subject.

Further, in this embodiment, the information to obtain correlation is extracted from the R signal among the output signals from the image sensor 2, however, the present invention is not limited to this output signal. For example, the information may be extracted during processing by the processor 3 (e.g., after white-balance adjustment or g correction). Furthermore, the information may be extracted from the other signals than the R signal, such as the luminance signal or color difference signals.

As described above, the present embodiment realizes automatic zoom control to determine an image size by irradiating the subject by a light projector with light at fixed time intervals, extracting information on the interval between the subject's eyes by calculation of frame correlation by the correlation calculator, and controlling zooming such that the interval is a predetermined value. Accordingly, the present embodiment can provide excellent auto-zoom function to video cameras for TV conference system or cameras dedicatedly used for taking facial photographs.

Next, a first modification to the embodiment will be described with reference to FIG. 5. In the embodiment, zoom control is made such that the image-sensing size with respect to a subject is a predetermined value. In this modification, the video camera has a pan head controlled such that the subject is located at a predetermined position within the image-sensing screen. The video camera has basically the same construction as that of FIG. 1, therefore, only the different portion will be described.

Similarly to the first embodiment, the output from the adder 7 is inputted into one of the input terminals of the adder 8, and at the same time, inputted into the auto gain controller 9 of the pan head controller 20.

The output from the auto gain controller 9 is inputted into the binarization circuit 10, at which the input data is converted into a binarization signal having "1" and "0" values, and the binary signal is outputted to the calculator 21.

The calculator 21 calculates the two-dimensional positions of the subject's eyes based on the binary signal from the binarization circuit 10, and controls the pan head driver 22 for driving the pan head (not shown).

[First Modification to Embodiment]

Next, pan head control of the present embodiment will be described with reference to FIG. 5.

Figure 5:
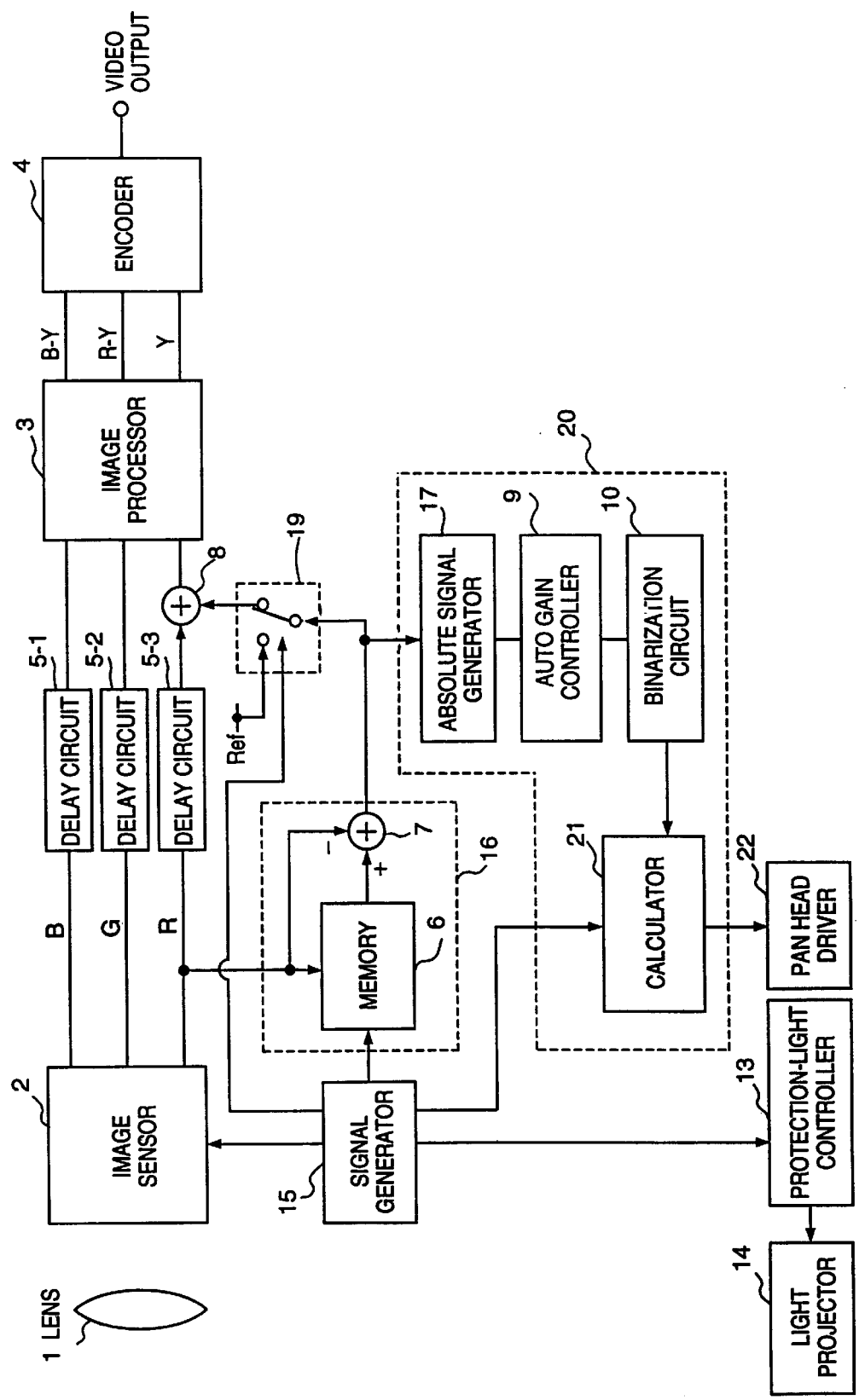
FIG. 5 is a block diagram showing the construction of the image sensing circuit in the video camera, according to a first modification to the embodiment.

In FIG. 5, the elements corresponding to those in FIG. 1 have the same reference numerals and the explanations of the elements will be omitted.

The output from the correlation calculator 16 (adder 7) is forwarded to a pan head controller 20. In the pan head controller 20, the absolute signal generator 17 unifies the polarity of the output from the correlation calculator 16 to be constant in all the frames (output FIG. 2(8)), the auto gain controller 9 adjusts the peak levels of the signal from the absolute signal generator 17 to a constant level, and the binarization circuit 10 converts the signal into binary signal having "1" and "0" values (output FIG. 2(9)). In this manner, the positions of the subject's eyes are extracted. Then, a calculator 21 performs similar processings to those of the calculator 11 in FIG. 1, to calculate the interval between the subject's eyes and control the pan head driver 22 based on the calculated interval such that the central position of the interval is a predetermined value. The predetermined value is the position of the subject within the image-sensing screen, e.g., the center of the image-sensing screen. For this control, the LUT 35 contains, in advance, pan head control values for centering the central position of the interval in the image-sensing screen.

Note that the calculator 21 comprises a simple hardware such as a microprocessor.

In this control, similar to the zoom control procedure as described with reference to FIGS. 2(1) to 2(9) and 3, the interval between the eyes and the central position of the interval are calculated from the information on the position of the subject's eyes, and the pan head is controlled based on the calculated results.

Note that a video camera may be provided separately from the set of a pan head (not shown), the pan head driver 22 and the pan head controller 22, however, constructing the video camera integrally with the pan head and pan head driving devices optimizes the advantageous feature of the invention.

As described above, the present modification realizes automatic homing function by irradiating the subject person by the light projector at fixed intervals, extracting information on the interval between the subject's eyes and the central position of the interval by calculation of frame correlation by the correlation calculator, and controlling the pan head such that the central position comes to a predetermined position. Accordingly, the present modification can provide excellent automatic homing function to video cameras for TV conference system or cameras dedicatedly used for taking facial photographs.

[Second Modification to Embodiment]

This modification employs the combination of the zoom control and the pan head control as described in the embodiment and the first modification so as to obtain more excellent portrait images. Note that the video camera of this modification has basically the same construction as that of FIG. 1, therefore, only the different portion will be described.

Figure 6:
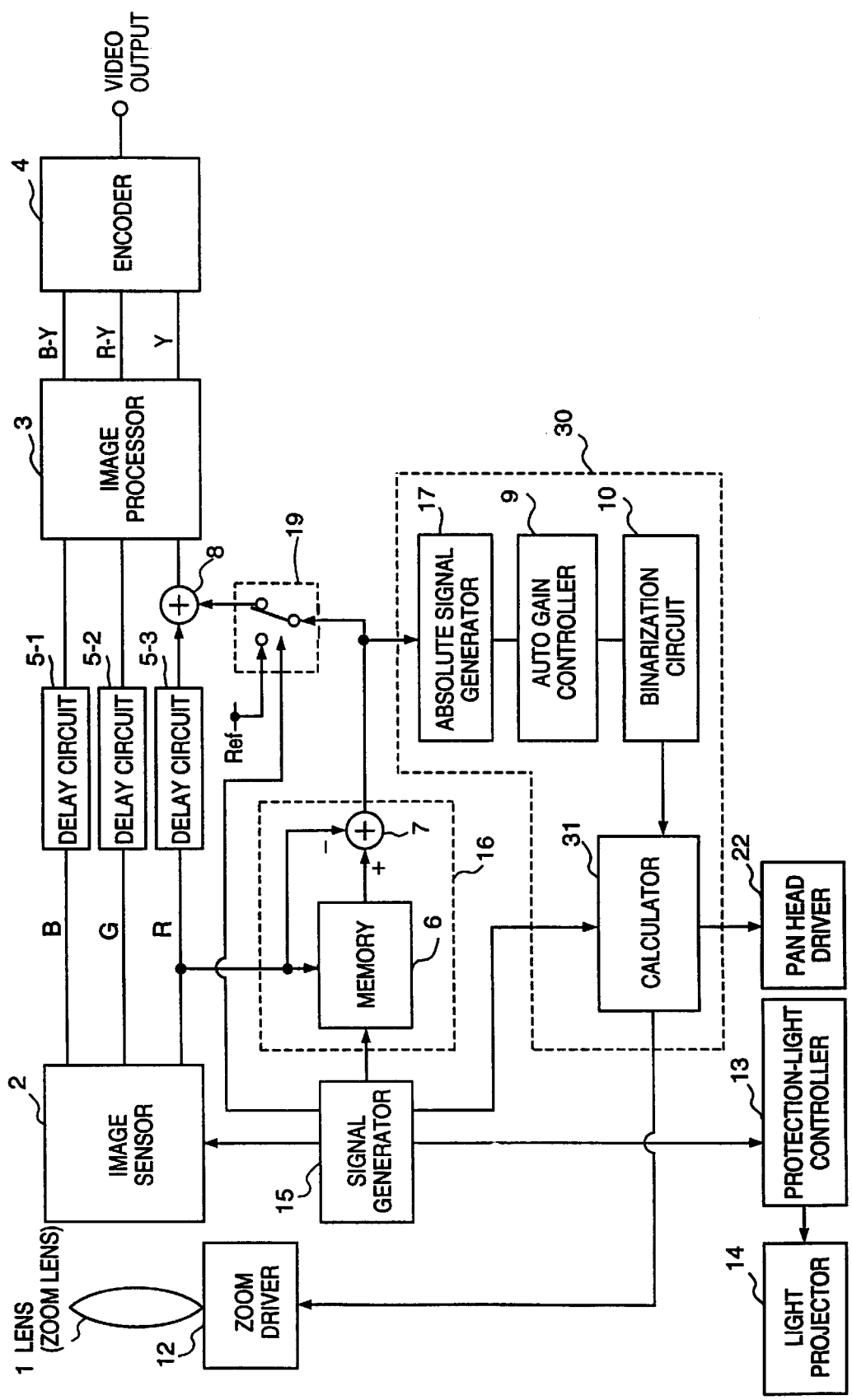
FIG. 6 is a block diagram showing the construction of the image sensing circuit in the video camera, according to a second modification to the embodiment.

FIG. 6 is a block diagram showing the construction of the image sensing circuit of the video camera, according to the second modification to the embodiment. In FIG. 6, the elements corresponding to those in FIG. 1 have the same reference numerals and the explanations of the elements will be omitted.

Numeral 30 denotes an image-sensing controller; and 31, a calculator. The calculator 31 calculates the interval between the subject's eyes from the binary data from the binarization circuit 10, and controls the zoom driver 12 such that the interval is a predetermined value in the image-sensing screen and the central position of the interval is located at a predetermined position in the image-sensing screen. In this modification, the LUT 35 contains in advance control amounts for the zooming control and the pan head control as described above. This enables to always display a subject image in a predetermined size and at a predetermined position in the image-sensing screen.

The present invention can be applied to a system constituted by a plurality of devices or to an apparatus comprising a single device.

The present invention is not limited to the above embodiments and various changes and modifications can be made within the spirit and scope of the present invention. Therefore, to apprise the public of the scope of the present invention, the following claims are made.

What is claimed is:

1. A video camera having:

a zoom lens capable of varying its focal distance;

image sensing means for image-sensing a user via said zoom lens and outputting an image signal of the user; and signal processing means for converting the image signal into a display signal, comprising:

memory means for storing the image signal outputted by said image sensing means;

calculation means for detecting images of user's eyes from the image signal as a feature of the user and calculating a change of a distance between a right eye and a left eye of the user's eyes by comparing the image signal stored in said memory means and the image signal outputted from said image signal sensing means; and zoom driving means for driving said zoom lens such that the calculated distance is maintained at a predetermined value.

2. The video camera according to claim 1, further comprising a light projection mean for projecting light on the user at fixed time intervals, and wherein said calculation means extracts light reflected from retinas of the user's eyes when said light projection means projects light on the user, and calculates the distance between the user's eyes based on the extracted light.

3. The video camera according to claim 2, wherein said calculation means calculates the distance between the user's eyes based on a reference clock from said image sensing means and horizontal and vertical scanning signals of said video camera.

4. The video camera according to claim 2, wherein said light projection means projects light having a wavelength within a range of red light signal of said image sensing means.

5. The video camera according to claim 4, wherein the light is infrared light.

6. The video camera according to claim 1, wherein said light projection means projects light having a wavelength within a spectral sensitivity range of said image sensing means.

7. A video camera having:
   image sensing means for image-sensing a user and outputting an image signal of the user; and
   signal processing means for converting the image signal into a display signal, comprising:
      detecting means for detecting an image signal of user's eyes from the image signal outputted by said image sensing means;
      calculation means for calculating a change of a position of the user's eyes based on the image signal outputted from said detecting means; and
      pan head control means for controlling an external pan head or pan head of said video camera for changing a direction of said video camera such that the calculated position of the user's eyes is substantially maintained at a predetermined position of an image screen.

8. The video camera according to claim 7, wherein said calculation means extracts light reflected from retinas of the user's eyes when said light projection means projects light on the user, and calculates the distance between the user's eyes based on the extracted light for calculating a change of a position of the user's eyes.

9. The video camera according to claim 8, wherein said calculation means calculates the distance between the user's eyes based on a reference clock from said image sensing means and horizontal and vertical scanning signals of said video camera.

10. The video camera according to claim 8, wherein said light projection means projects light having a wavelength within a range of red light signal of said image sensing means.

11. The video camera according to claim 10, wherein the light is infrared light.

12. The video camera according to claim 7, wherein said light projection means projects light having a wavelength within a spectral sensitivity range of said image sensing means.

13. An image sensing device comprising:
   a zoom lens capable of varying its focal distance;
   image sensing means for image-sensing a user via said zoom lens and outputting an image signal of the user;
   detecting means for detecting an image signal of user's eyes from the image signal outputted by said image sensing means;
   calculation means for calculating a distance between the user's eyes and change of a position of the user's eyes based on the image signal outputted from said image sensing means;
   zoom driving means for driving said zoom lens such that the calculated distance is maintained at a predetermined value; and
   pan head control means for controlling an external pan head or pan head of said image sensing device for changing a direction of said image sensing device such that calculated position of the user's eyes is substantially maintained at a predetermined position of an image screen.

14. The device according to claim 13, further comprising a light projection means for projecting light on the user at fixed time intervals, and wherein said calculation extracts light reflected from retinas of the user's eyes when said light projection means projects light on the user, and calculates the distance between the user's eyes based on the extracted light.

15. The device according to claim 14, wherein said calculation means calculates the distance between the user's eyes based on a reference clock from said image sensing means and horizontal and vertical scanning signals of said image sensing device.

16. The device according to claim 14, wherein said light projection means projects light having a wavelength within a range of red light signal of said image sensing means.

17. The device according to claim 16, wherein the light is infrared light.

18. The device according to claim 13, wherein said light projection means projects light having a wavelength within a special sensitivity range of said image sensing means.

19. A control method for a video camera comprising:
   an image sensing step of image-sensing a user using an image sensor to produce an image signal of the user; and
   a signal processing step of converting the image signal into a display signal by
      detecting the user's eyes from the image signal obtained in said image signal obtained in said detecting step; and sensing step;
      calculating a change of a position of the user's eyes based on the image signal obtained in said detecting step; and
      controlling an external pan head or pan head of the video camera for changing direction of the video camera such that the calculated position of the user's eyes is substantially maintained at a predetermined position of an image screen.

20. The method according to claim 19, wherein the calculating includes determining a change of distance between the user's eyes as the change of a position of the user's eyes.

21. The method according to claim 19, further comprising projecting light on the user at fixed intervals, and wherein the calculating extracts light reflected from retinas of the user's eyes when the light is projected on the user during the fixed intervals, and calculates a distance between the user's eyes based on the extracted light for calculating a change of a position of the user's eyes.

22. The method according to claim 21, wherein the calculating determines the distance between the user's eyes based on a reference clock signal outputted from the image sensor and horizontal and vertical scanning signals of the video camera.

23. The method according to claim 21, wherein the light projecting projects light having a wavelength within a spectral sensitivity range of the image sensor.

24. The method according to claim 21, wherein the light projecting projects light having a wavelength within a range of red light signal of the image sensor.

25. The method according to claim 24, wherein the light is infrared light.

* * * * *

UNITED STATES PATENT AND TRADEMARK OFFICE
CERTIFICATE OF CORRECTION

PATENT NO. : 6,172,706 B1
DATED : January 9, 2001
INVENTOR(S) : Shingo Tatsumi

Page 1 of 1

It is certified that error appears in the above-identified patent and that said Letters Patent is hereby corrected as shown below:

<u>Column 11,</u>
Line 14, "of the user's" should read -- of a user's --

<u>Column 12,</u>
Lines 27-29, "detecting the user's eyes from the image signal obtained in said image signal obtained in said detecting step; and sensing step;" should read -- detecting the user's eyes from the image signal obtained in said image sensing step; --

Line 34, "changing direction" should read -- changing a direction --

Signed and Sealed this

Fourteenth Day of May, 2002

*Attest:*

JAMES E. ROGAN
*Attesting Officer*     *Director of the United States Patent and Trademark Office*